United States Patent
Shen et al.

(10) Patent No.: US 10,353,728 B2
(45) Date of Patent: *Jul. 16, 2019

(54) METHOD, SYSTEM AND DEVICE FOR MANAGING VIRTUAL MACHINE SOFTWARE IN CLOUD ENVIRONMENT

(71) Applicant: ZTE Corporation, Shenzhen (CN)

(72) Inventors: Gaiying Shen, Shenzhen (CN); Bo Liu, Shenzhen (CN); Beijie Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,860

(22) Filed: Jan. 24, 2017

(65) Prior Publication Data
US 2017/0132031 A1    May 11, 2017

Related U.S. Application Data

(63) Continuation of application No. 14/425,079, filed as application No. PCT/CN2013/081413 on Aug. 13, 2013, now Pat. No. 9,588,794.

(30) Foreign Application Priority Data

Aug. 30, 2012 (CN) .......................... 2012 1 0315521

(51) Int. Cl.
*G06F 8/60* (2018.01)
*G06F 8/61* (2018.01)
(Continued)

(52) U.S. Cl.
CPC ............ *G06F 9/45558* (2013.01); *G06F 8/60* (2013.01); *G06F 8/61* (2013.01); *G06F 8/62* (2013.01);
(Continued)

(58) Field of Classification Search
CPC ........... G06F 8/61; G06F 9/45533; G06F 8/65
(Continued)

(56) References Cited

U.S. PATENT DOCUMENTS 8,775,577 B1 * 7/2014 Alford .................... H04L 67/34
709/221
9,021,008 B1 * 4/2015 Andrus ................... H04L 43/50
709/201

(Continued)

*Primary Examiner* — Phillip H Nguyen
(74) *Attorney, Agent, or Firm* — Cantor Colburn LLP

(57) ABSTRACT

A method for managing software on a virtual machine in a cloud environment is provided. The method includes: a host transmits a software management request to a virtual machine; the host acquires a software management script from a shared storage server according to a request for the management script returned by the virtual machine after the software management request is received; and the host transmits the acquired software management script to the virtual machine and indicates the virtual machine to execute the software management script. A system and a device for managing software on the virtual machine in a cloud environment are also provided. By the schemes of the present invention, the operation of needing to configure an IP address to the virtual machine when the virtual machine software is managed is avoided. Meanwhile, the problem that the software of a virtual machine not configured with an IP address in a cloud environment cannot be managed is solved.

17 Claims, 3 Drawing Sheets

(51) Int. Cl.
  *G06F 9/50*     (2006.01)
  *G06F 9/455*    (2018.01)
  *H04L 29/08*    (2006.01)

(52) U.S. Cl.
  CPC ........ *G06F 9/45533* (2013.01); *G06F 9/5077* (2013.01); *H04L 67/10* (2013.01); *H04L 67/34* (2013.01); *G06F 2009/45595* (2013.01)

(58) Field of Classification Search
  USPC .................... 718/1; 717/176, 178, 174, 168
  See application file for complete search history.

(56) References Cited

U.S. PATENT DOCUMENTS

| | | | |
|---|---|---|---|
| 2008/0114860 A1* | 5/2008 | Keys ........................ | G06F 8/61 709/219 |
| 2009/0138548 A1* | 5/2009 | Kumagai ............ | G06F 9/45504 709/203 |
| 2009/0193413 A1* | 7/2009 | Lee ...................... | G06F 9/4416 718/1 |
| 2012/0030672 A1* | 2/2012 | Zygmuntowicz ......... | G06F 8/60 718/1 |
| 2012/0054744 A1* | 3/2012 | Singh ..................... | G06F 21/53 718/1 |
| 2014/0029029 A1* | 1/2014 | Akuzawa ............... | G06K 15/00 358/1.11 |

\* cited by examiner

METHOD, SYSTEM AND DEVICE FOR MANAGING VIRTUAL MACHINE SOFTWARE IN CLOUD ENVIRONMENT

CROSS REFERENCE TO RELATED APPLICATION

This application is a continuation of U.S. patent application Ser. No. 14/425,079 which was filed on Mar. 2, 2015 under 35 U.S.C. 371 as the U.S. national stage of International Patent Application Number PCT/CN2013/081413 which was filed on Aug. 13, 2013 claiming priority to Chinese Patent Application Number 201210315521.7 filed on Aug. 30, 2012, all of which said applications are herein incorporated by reference in their entirety.

FIELD OF THE INVENTION

The present disclosure relates to the field of cloud technologies, and in particular to a method, a system and a device for managing software on a virtual machine in a cloud environment.

BACKGROUND OF THE INVENTION

Currently, when the software resources on a virtual machine in the cloud environment are installed or uninstalled, an Internet Protocol (IP) address needs to be configured to the virtual machine running in a host in the cloud environment, and instructions are transmitted to the virtual machine through a Virtual Private Network (VPN). In this way, the virtual machine may download software from a shared software server and install the software according to the instructions, or perform corresponding uninstallation operations according to the instructions.

When the number of virtual machines in the cloud environment is large, configuring the IP address to the virtual machine needs a lot of work, which brings inconvenience for management persons. Meanwhile, in view of security, some virtual machines in the cloud environment are not configured with the IP address, which will result in the software resources on the virtual machines without the IP address cannot be managed.

To sum up, the related art has the problem that the management and configuration of the virtual machine is very complicated and the software on the virtual machine without the IP address cannot be managed.

SUMMARY OF THE INVENTION

In view of this, the embodiments of the present disclosure provide a method, a system and a device for managing software on the virtual machine in a cloud environment, by which the problem in the related art that the management and configuration of the virtual machine is very complicated and the software of the virtual machine not configured with the IP address cannot be managed is solved.

To this end, the technical schemes of the embodiments of the present disclosure are implemented as follows.

The embodiments of the present disclosure provide a method for managing software on the virtual machine in a cloud environment, including that:

a host transmits a software management request to a virtual machine;

the host acquires a software management script from a shared storage server according to a request for the management script returned by the virtual machine after the software management request is receive; and the host transmits the acquired software management script to the virtual machine and indicates the virtual machine to execute the software management script.

Preferably, transmitting, by the host, the software management request to the virtual machine includes:

when the host receives the software management request transmitted by a virtualization management server, transmitting the software management request to the virtual machine, wherein the software management request received by the host is transmitted after the virtualization management server generates the software management script according to the software management request of a client and uploads the software management script to the shared storage server.

Preferably, the software management request includes a software installation request and a software uninstallation request;

the request for the management script includes a request for a software installation script and a request for a software uninstallation script; and the software management script includes a software installation script and a software uninstallation script.

Preferably, the method further includes:

when the host transmits the acquired software installation script to the virtual machine and indicates the virtual machine to execute the software installation script, transmitting, by the host, a software installation package to the virtual machine according to a software installation package request initiated when the virtual machine executes the software installation script, and indicating the virtual machine to install the software installation package.

Preferably, before the host transmits the software installation package to the virtual machine, the method further includes:

acquiring, by the host, the software installation package from the shared storage server according to the software installation package request transmitted by the virtual machine.

Preferably, a Para-virtualization serial port is created in the virtual machine;

correspondingly, the host transmits the software management request, the software management script or a software installation package to the virtual machine through the Para-virtualization serial port, and receives the request for the management script transmitted by the virtual machine through the Para-virtualization serial port.

The embodiments of the present disclosure provide a host, which is located in a cloud environment and runs a virtual machine, the host including: a first receiving unit, an acquiring unit and a first transmission unit, wherein the first receiving unit is configured to receive a request for the management script returned by the virtual machine after the software management request is receive;

the acquiring unit is configured to acquire the software management script from the shared storage server according to the request for the management script received by the first receiving unit; and the first transmission unit is configured to transmit the software management request to the virtual machine, and transmit the software management script acquired by the acquiring unit to the virtual machine.

Preferably, the first transmission unit is further configured to transmit the software management request to the virtual machine when the first receiving unit receives the software management request transmitted by a virtualization management server, wherein the software management request received by the host is transmitted after the virtualization management server generates the software management script according to the software management request of a client and uploads the software management script to the shared storage server.

Preferably, the software management request includes a software installation request and a software uninstallation request;

the request for the management script includes a request for a software installation script and a request for a software uninstallation script; and the software management script includes the software installation script and the software uninstallation script.

Preferably, the first receiving unit is further configured to receive a software installation package request transmitted by the virtual machine after the first transmission unit transmits the software installation script to the virtual machine;

the acquiring unit is further configured to acquire the software installation package from a shared storage server according to the software installation package request received by the first receiving unit; and the first transmission unit is further configured to transmit the software installation package acquired from the shared storage server to the virtual machine.

Preferably, the first transmission unit transmits the software management request, the software management script or the software installation package to the virtual machine through a Para-virtualization serial port in the virtual machine, and receives the request for the management script transmitted by the virtual machine through the Para-virtualization serial port.

The embodiments of the present disclosure provide a virtual machine, which is run on a host in a cloud environment, the virtual machine including: a second receiving unit, a second transmission unit and an execution unit, wherein the second receiving unit is configured to receive a software management request transmitted by the host, and receive a software management script transmitted by the host after the second transmission unit transmits a request for the management script to the host;

the second transmission unit is configured to transmit a request for the management script to the host when the second receiving unit receives a software management request transmitted by the host; and the execution unit is configured to execute the software management script after the second receiving unit receives the software management script transmitted by the host.

Preferably, the software management request includes a software installation request and a software uninstallation request;

the request for the management script includes a request for a software installation script and a request for a software uninstallation script; and the software management script includes the software installation script and the software uninstallation script.

Preferably, the execution unit further includes:

a triggering subunit, configured to trigger the second transmission unit to execute an operation of transmitting a software installation package request to the host when the second receiving unit receives the software installation script;

the second transmission unit is further configured to transmit the software installation package request to the host when the triggering subunit triggers the second transmission unit to execute the operation of transmitting the software installation package request to the host; and the second receiving unit is further configured to receive the software installation package transmitted by the host after the second transmission unit transmits the software installation package request to the host.

Preferably, the second receiving unit is further configured to receive the request for the management script, the software management script or the software installation package transmitted by the host through a Para-virtualization serial port in the virtual machine, and the second transmission unit is further configured to transmit the request for the management script or the software installation package request to the host through the Para-virtualization serial port in the virtual machine.

Correspondingly, the embodiments of the present disclosure also provide a system for managing software on the virtual machine in a cloud environment, including: a shared storage server, a virtual machine and a host running the virtual machine, wherein the shared storage server is configured to store a software management script;

the host is configured to transmit a software management request to the virtual machine, acquire a software management script from the shared storage server according to a request for the management script returned by the virtual machine after the software management request is receive, and transmit the acquired software management script to the virtual machine and indicate the virtual machine to execute the software management script; and the virtual machine is configured to receive the software management request transmitted by the host, and return the request for the management script to the host.

Preferably, the system further includes a client and a virtualization management server, wherein the virtualization management server is configured to generate the software management script according to the software management request transmitted by the client, upload the generated software management script to the shared storage server and transmit the software management request to the host.

Preferably, the host includes the first receiving unit, the acquiring unit and the first transmission unit, and the virtual machine includes the second receiving unit, the second transmission unit and the execution unit. The function of each unit is the same as the above.

In the technical schemes of the embodiments of the present disclosure, the host receives the software management instruction, and acquires the software management script or software installation package from the shared storage server, and the software management request, the software management script or the software installation package is transmitted to the virtual machine through the Para-virtualization serial port of the virtual machine to finish the operation off software management. In this way, there is no need to use the VPN as a transmission channel of the software management request, the software management script or the software installation package, which avoids the operation of configuring the IP address to the corresponding virtual machine to manage the software of the virtual machine, and saves management time. Meanwhile, the problem that some virtual machines are not configured with the IP addresses for security and the software of the virtual machine cannot be managed is solved.

DETAILED DESCRIPTION OF THE EMBODIMENTS

The present disclosure will be further described below in detail in conjunction with the accompanying drawings and specific embodiments.

Figure 1:
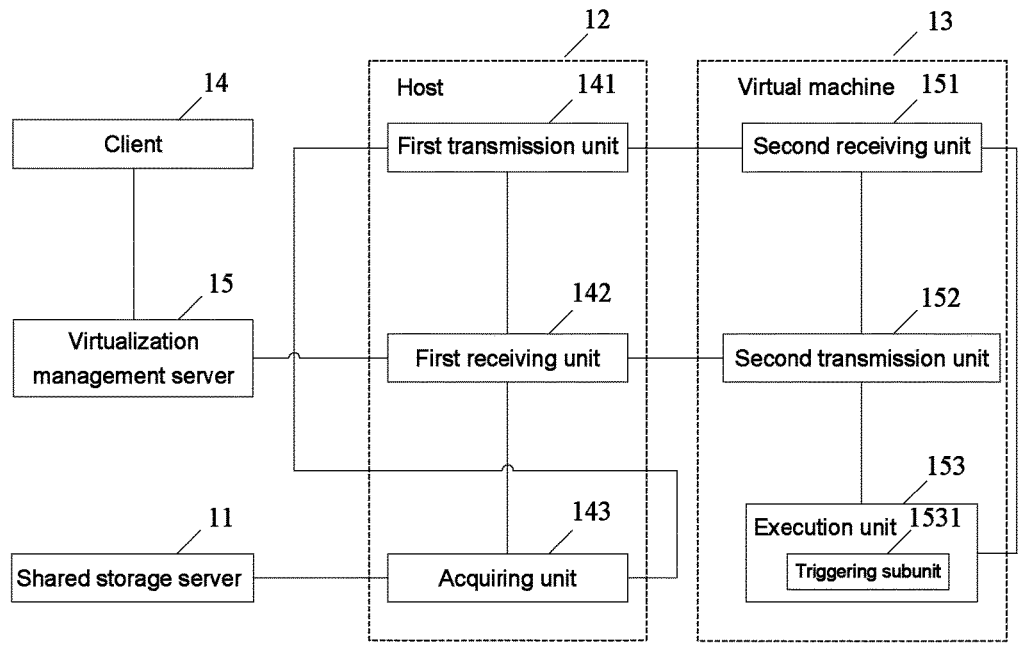
FIG. 1 is a structural diagram of a system for managing software on the virtual machine in a cloud environment according to an embodiment of the present disclosure.

FIG. 1 is a structural diagram of a system for managing software on the virtual machine in a cloud environment according to an embodiment of the present disclosure. As shown in FIG. 1, the system includes: a shared storage server 11, a host 12 and a virtual machine 13 run on the host 12, wherein the shared storage server 11 is configured to store a software management script;

the host 12 is configured to transmit a software management request to the virtual machine 13, acquire a software management script from the shared storage server 11 according to a request for the management script returned after the virtual machine 13 receives the software management request, and transmit the acquired software management script to the virtual machine 13 and indicate the virtual machine 13 to execute the software management script; and the virtual machine 13 is configured to receive the software management request transmitted by the host 12, and return the request for the management script to the host 12.

The system further includes: a client 14 and a virtualization management server 15, wherein the virtualization management server 15 is configured to generate the software management script according to the software management request transmitted by the client 14, upload the generated software management script to the shared storage server 11 and transmit the software management request to the host 12.

The host 12 includes: a first transmission unit 121, a first receiving unit 122 and an acquiring unit 123, wherein the first transmission unit 121 is configured to transmit the software management request to the virtual machine 13, and transmit the software management script acquired by the acquiring unit to the virtual machine 13;

the first receiving unit 122 is configured to receive a request for the management script returned after the virtual machine 13 receives the software management request; and the acquiring unit 123 is configured to acquire the software management script from the shared storage server 11 according to the request for the management script received by the first receiving unit 122.

The first transmission unit 121 is further configured to transmit the software management request to the virtual machine 13 when the first receiving unit 122 receives the software management request transmitted by a virtualization management server 15, wherein the software management request received by the host 12 is transmitted after the virtualization management server 15 generates the software management script according to the software management request of a client 14 and uploads the software management script to the shared storage server 11.

The software management request includes a software installation request and a software uninstallation request;

the request for the management script includes a request for a software installation script and a request for a software uninstallation script; and the software management script includes a software installation script and a software uninstallation script.

The first receiving unit 122 is further configured to receive a software installation package request transmitted by the virtual machine 13 after the first transmission unit 121 transmits the software installation script to the virtual machine 13; and the acquiring unit 123 is further configured to acquire the software installation package from a shared storage server 11 according to the software installation package request received by the first receiving unit 122 and transmitted by the virtual machine 13.

The virtual machine 13 includes: a second receiving unit 131, a second transmission unit 132 and an execution unit 133, wherein the second receiving unit 131 is configured to receive a software management request transmitted by the host 12, and receive a software management script transmitted by the host 12 after the second transmission unit 132 transmits the request for the management script to the host 14;

the second transmission unit 132 is configured to transmit the request for the management script to the host 12 when the second receiving unit 131 receives the software management request transmitted by the host 2; and the execution unit 133 is configured to execute the software management script after the second receiving unit 131 receives the software management script transmitted by the host 12.

The execution unit 133 further includes:

a triggering subunit 1331, configured to trigger the second transmission unit 132 to execute an operation of transmitting a software installation package request to the host 12 when the software management script received by the second receiving unit 131 is the software installation script;

the second transmission unit 132 is further configured to transmit the software installation package request to the host 12 when the triggering subunit 1331 triggers the second transmission unit 132 to execute the operation of transmitting the software installation package request to the host 12; and the second receiving unit 131 is further configured to receive the software installation package transmitted by the host 12 after the second transmission unit 132 transmits the software installation package request to the host 12.

The second receiving unit 131 is further configured to receive the software management request, the software management script or the software installation package transmitted by the host 12 through a Para-virtualization serial port in the virtual machine 13, and the second transmission unit 132 is further configured to transmit the request for the management script or the software installation package request to the host 12 through the Para-virtualization serial port in the virtual machine 13.

In the practical application, all of the first transmission unit 121, the first receiving unit 122 and the acquiring unit 123 may be implemented by a Central Processing Unit (CPU), a Digital Signal Processor (DSP) or Field Programmable Gate Array (FPGA) in the host 12.

The second receiving unit 131, the second transmission unit 132 and the execution unit 133 may be implemented by the CPU, the DSP or the FPGA of the host 12 on which the virtual machine 13 runs.

Figure 2:
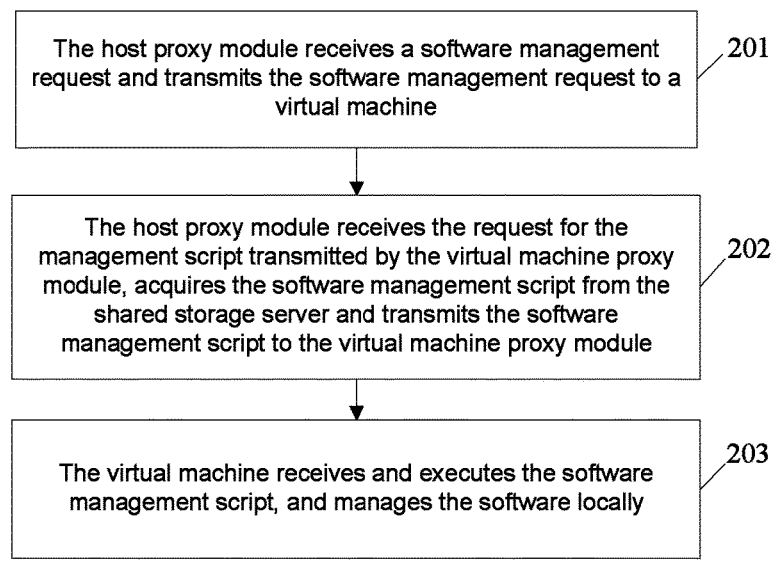
FIG. 2 is a flowchart of implementing a method for managing software on the virtual machine in a cloud environment according to an embodiment of the present disclosure.

FIG. 2 is a flowchart of implementing a method for managing software on the virtual machine in a cloud environment according to an embodiment of the present disclosure, as shown in FIG. 2, including the following steps:

Step 201: The host receives a software management request and transmits the software management request to a virtual machine.

The software management request includes a software installation request and a software uninstallation request.

Before the host receives the software management request, the flow further includes that:

the client receives a virtual machine software management instruction assigned by a user, and transmits the software management request to a virtualization management server; the virtualization management server receives the software management request, generates a software management script according to the software management request, uploads the software management script to the shared storage server and transmits the software management request to the host.

The software management script includes a software installation script and a software uninstallation script.

The virtualization management server and the client adopt a master and slave architecture, the client provides a graphic human-machine interface which used for assigning the software management instruction to the virtualization management server.

The virtual machine and all the software resources in the cloud environment have been assigned identifiers in advance, and the software management request carries a virtual machine identifier corresponding to the virtual machine of request management software, and a software identifier corresponding to the request management software.

The virtualization management server receives the software management request, and generates the software management script according to the software management request, which may be implemented in a way as follows.

The virtualization management server receives the software management request, extracts the software identifier carried in the software management request, searches configuration information of the request management software from its own database by taking the software identifier as an index, and writes the configuration information into the software management script, wherein the configuration information includes acquiring a software installation package, operating the software installation package, completing software installation or operating a data file corresponding to the installed software to finish the process of software uninstallation.

The shared storage server is responsible for storing the software installation package and the software management script corresponding to the software installation package. Since all the software resources in the cloud environment are assigned with a unique software identifier, it is possible to determine the name and version of the request management software and a corresponding software management script in the database maintained by the storage server according to the software identifier of the request management software.

When the virtualization management server needs to transmit the software management request to the host, the virtualization management server extracts the virtual machine identifier in the received software management request, determines the IP address of the host on which the virtual machine relies accordingly, and transmits the software management request to the host through the VPN.

The virtualization management server maintains the virtual machine identifier and a relationship database corresponding to the IP address of the host on which the virtual machine relies locally. In this way, after the virtualization management server receives the software management request, the virtualization management server searches the request from the above database by taking the virtual machine identifier as the index, and the IP address of the host on which the virtual machine relies may be determined.

The communication between the virtual machine and the host is implemented by creating a Para-virtualization serial port in the virtual machine. In the related art of the virtual machine, the Para-virtualization serial port is allowed to be created in the virtual machine, and the communication between the host and the virtual machine is implemented by the Para-virtualization serial port. For example, when the host needs to transmit the software management request to the virtual machine, the host extracts the virtual machine identifier in the software management request received by the host, determines the virtual machine of required communication by the identifier, and transmits the software management request to the Para-virtualization serial port pre-created by the virtual machine, and the virtual machine may receive the software management request through the serial port.

Step 202: The host receives the request for the management script transmitted by the virtual machine, acquires the software management script from the shared storage server and transmits the software management script to the virtual machine.

The step of the virtual machine transmitting the request for the management script may be implemented in a way as follows:

the virtual machine receives the software management request transmitted by the host and transmits the request for the management script to the host, wherein the request for the management script carries the virtual machine identifier corresponding to the virtual machine of the request management software, and the software identifier corresponding to the request management software.

the step of the host acquiring the software management script from the shared storage server may be implemented in a way as follows:

the host receives the request for the management script, extracts the software identifier carried in the request for the management script, and retrieves and reads the software management script from the shared storage server by taking the software identifier as the index, Wherein the request for the management script includes the request for the software installation script and the request for the software uninstallation script.

The data transmission between the virtual machine and the host is implemented in a way the same as Step 201. For example, when the host needs to transmit the software management script to the virtual machine, the host extracts the virtual machine identifier in the request for the management script received by the host, determines the virtual machine of the required communicated by the identifier, and transmits the software management script to the Para-virtualization serial port pre-created by the virtual machine, and the virtual machine may receive the software management script through the serial port. Correspondingly, when the virtual machine needs to transmit the request for the management script to the host, the virtual machine transmits the request for the management script to the Para-virtualization serial port pre-created by the virtual machine, and the host may receive the request for the management script through the Para-virtualization serial port.

Step 203: The virtual machine receives and executes the software management script, and manages the software locally.

When the software management script is the software installation script, that the virtual machine receives and executes the software management script, and manages the software locally may be implemented in a way as follows:

The virtual machine receives the software installation script, transmits the software installation package request to the host according to the software installation script to request the software installation package, and after receiving the software installation package transmitted by the host, operates the software installation package according to the software installation script, and the software installation is completed.

The virtual machine receives the software installation script, after the software installation package request is transmitted to the host to request the software installation package according to the software installation script, the host acquires the software installation package from the shared storage server when receiving the software installation package request transmitted by the virtual machine and transmits the same to the virtual machine.

The software installation package request carries the virtual machine identifier corresponding to the virtual machine of request installation software and the software identifier corresponding to the request installation software.

That the host acquires the software installation package from the shared storage server may be implemented in a way as follows: the host, after receiving the software installation package request, extracts the software identifier carried in the software installation package request, and searches and reads the software installation package from the shared storage server by taking the identifier as the index.

When the software management script is the software uninstallation script, the virtual machine receives the software uninstallation script and manages the software locally according to the software uninstallation script.

The data transmission between the virtual machine and the host is implemented in a way the same as Step 202, and is not repeated herein.

After Step 203, i.e., the virtual machine has finished the operation of installing or uninstalling software, the virtual machine confirms to the host that the installation or uninstallation has been completed, the host confirms to the virtualization management server that the installation or uninstallation has been completed, and the virtualization management server further confirms to the client that the installation or uninstallation has been completed, so as to notify the user that the software installation or uninstallation has been completed.

Figure 3:
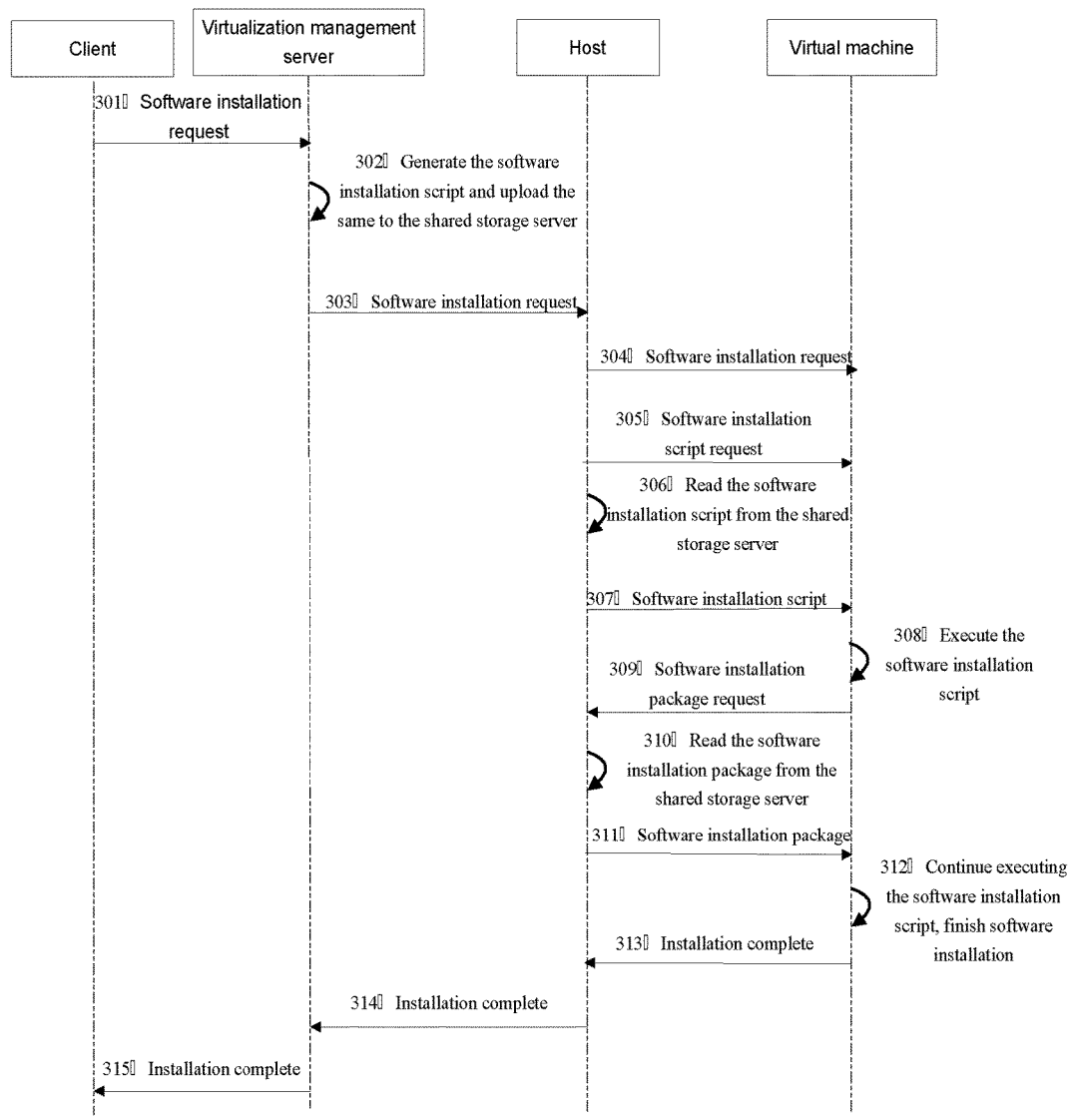
FIG. 3 is a flowchart of implementing virtual machine install software in a cloud environment according to an embodiment of the present disclosure.

FIG. 3 is a flowchart of implementing virtual machine software installation in a cloud environment according to an embodiment of the present disclosure, as shown in FIG. 3, including the following steps:

Step 301: The client receives a virtual machine software installation instruction from a user, and transmits the software installation request to the virtualization management server.

The virtualization management server and the client adopt a master and slave architecture, the client provides a graphic human-machine interface which assigns the software installation instruction to the virtualization management server.

The above software installation request carries the virtual machine identifier corresponding to the virtual machine of the request installation software, and the software identifier corresponding to the request installation software, wherein the virtual machine identifier and the software identifier are assigned in advance in the cloud environment.

Step 302~Step 303: The virtualization management server, after receiving the software installation request, generates the software installation script according to the software installation request and uploads the software installation script to the shared storage server, and transmits the software installation request to the host.

The virtualization management server receives the software installation request, extracts the software identifier carried in the software installation request, searches installation configuration information of the request installation software from its own database by taking the software identifier as an index, and writes the configuration information into the software installation script, wherein the configuration information includes acquiring a software installation package, operating the software installation package, completing software installation.

The shared storage server is responsible for storing the software installation package and the software management script corresponding to the software installation package. Since all the software resources in the cloud environment are assigned with a unique software identifier, it is possible to determine the name and version of the request installation software and a corresponding software installation script in the database maintained by the storage server according to the software identifier of the request installation software.

That the virtualization management server transmits the software installation request to the host may be implemented in a way as follows: the virtualization management server extracts the virtual machine identifier in the received software management request, determines the IP address of the host on which the virtual machine relies by the identifier, and transmits the software management request to the host through the VPN.

The virtualization management server maintains the virtual machine identifier and a relationship database corresponding to the IP address of the host on which the virtual machine relies locally. In this way, after the virtualization management server receives the software installation request, the virtualization management server searches the request from the above database by taking the virtual machine identifier as the index, and the IP address of the host on which the virtual machine relies may be determined.

Step 304~Step 305: A host proxy module, after receiving the software installation request, forwards the software installation request to the virtual machine, and the virtual machine, after receiving the software installation request, transmits the software installation script request to the host.

The communication between the virtual machine and the host is implemented by creating a Para-virtualization serial port in the virtual machine. In the related art of the virtual machine, the Para-virtualization serial port is allowed to be created in the virtual machine, and the communication between the host and the virtual machine is implemented by the serial port.

When the host needs to transmit the software installation request to the virtual machine, the host extracts the virtual machine identifier in the software installation request received by the host, determines the virtual machine of required communication by the identifier, and transmits the software installation request to the Para-virtualization serial port pre-created by the virtual machine, and the virtual machine may receive the software management request through the serial port.

Correspondingly, when the virtual machine needs to transmit the software installation script request to the host, the virtual machine transmits the software installation script request to the Para-virtualization serial port pre-created by the virtual machine, and the host may receive the software installation script request through the serial port.

Step 306~Step 307: The host acquires the software installation script from the shared storage server, and transmits the software installation script to the virtual machine.

That the host acquires the software installation script from the shared storage server may be implemented in a way as follows: the host receives the software installation script request, then extracts the software identifier carried in the software installation script request, and retrieves and reads the software installation script from the shared storage server by taking the software identifier as the index.

The data transmission between the virtual machine and the host is implemented in a way the same as the above.

Step 308~Step 309: The virtual machine executes the software installation script, and transmits the software installation package request to the host.

Step 310~Step 311: The host acquires the software installation package from the shared storage server, and transmits the software installation package to the virtual machine.

That the host acquires the software installation package from the shared storage server may be implemented in a way as follows: the host receives the software installation package request, then extracts the software identifier carried in the software installation package request, and searches and reads the software installation package from the shared storage server by taking the identifier as the index.

The data transmission between the virtual machine and the host is implemented in a way the same as the above.

Step 312~Step 313: The virtual machine continues executing the installation script, finishes software installation, and confirms to the host software installation complete.

The communication between the virtual machine and the host is implemented in a way the same as the above.

Step 314: The host confirms to the virtualization management server software installation complete.

Step 315: The virtualization management server confirms to the client software installation complete.

The client notifies the user that the software installation is completed.

The information of software installation complete in Step 314-Step 315 is transmitted through the VPN.

Figure 4:
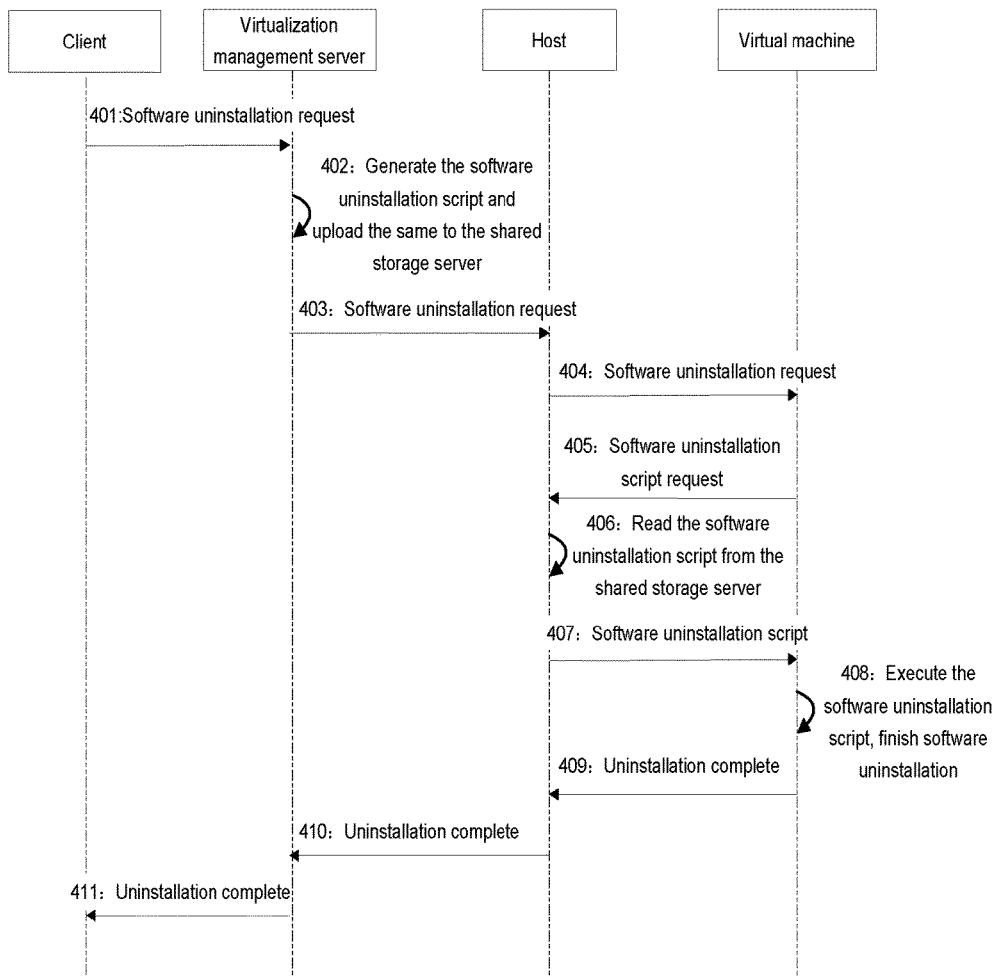
FIG. 4 is a flowchart of implementing virtual machine uninstallation software in a cloud environment according to an embodiment of the present disclosure.

FIG. 4 is a flowchart of implementing virtual machine uninstallation software in a cloud environment according to an embodiment of the present disclosure, as shown in FIG. 4, including the following steps:

Step 401: The client receives a virtual machine software uninstallation instruction from a user, and transmits the software uninstallation request to the virtualization management server.

The virtualization management server and the client adopt a master and slave architecture, the client provides a graphic human-machine interface which assigns the software uninstallation instruction to the virtualization management server.

The above software uninstallation request carries the virtual machine identifier corresponding to the virtual machine of the request uninstallation software, and the software identifier corresponding to the request uninstallation software, wherein the virtual machine identifier and the software identifier are pre-assigned in the cloud environment.

Step 402~Step 403: The virtualization management server, after receiving the software uninstallation request, generates the software uninstallation script according to the software uninstallation request and uploads the software uninstallation script to the shared storage server, and transmits the software uninstallation request to the host.

That the virtualization management server receives the software uninstallation request, and generates the software uninstallation script according to the software uninstallation request may be implemented in a way as follows: the virtualization management server receives the software uninstallation request, extracts the software identifier carried in the software uninstallation request, searches uninstallation configuration information of the request uninstallation software from its own database by taking the software identifier as an index, and writes the configuration information into the software uninstallation script, wherein the configuration information includes the regulations of operating the data file corresponding to the request uninstallation software, and the regulations of completing software uninstallation.

The shared storage server is responsible for storing the software uninstallation script. Since all the software resources in the cloud environment are assigned with a unique software identifier, it is possible to determine the name and version of the request uninstallation software and a corresponding software uninstallation script in the database maintained by the storage server according to the software identifier of the request uninstallation software.

That the virtualization management server transmits the software uninstallation request to the host may be implemented in a way as follows: the virtualization management server extracts the virtual machine identifier in the received software uninstallation request, determines the IP address of the host on which the virtual machine relies by the identifier, and transmits the software uninstallation request to the host through the VPN.

The virtualization management server maintains the virtual machine identifier and a relationship database corresponding to the IP address of the host on which the virtual machine relies locally. In this way, after the virtualization management server receives the software uninstallation request, the virtualization management server searches the request from the above database by taking the virtual machine identifier as the index, and the IP address of the host on which the virtual machine relies may be determined.

Step 404~Step 405: A host, after receiving the software uninstallation request, forwards the software uninstallation request to the virtual machine, and the virtual machine, after receiving the software uninstallation request, transmits the software uninstallation script request to the host.

The communication between the virtual machine and the host is implemented by creating a Para-virtualization serial port in the virtual machine. In the related art of the virtual machine, the Para-virtualization serial port is allowed to be created in the virtual machine, and the communication between the host and the virtual machine is implemented by the serial port.

When the host needs to transmit the software uninstallation request to the virtual machine, the host extracts the virtual machine identifier in the software uninstallation request received by the host, determines the virtual machine of required communication by the identifier, and transmits the software uninstallation request to the Para-virtualization serial port pre-created by the virtual machine, and the virtual machine may receive the software uninstallation request through the serial port.

Correspondingly, when the virtual machine needs to transmit the software uninstallation script request to the host, the virtual machine transmits the software uninstallation script request to the Para-virtualization serial port pre-created by the virtual machine, and the host may receive the software uninstallation script request through the serial port.

Step 406~Step 407: The host acquires the software uninstallation script from the shared storage server, and transmits the software uninstallation script to the virtual machine.

That the host acquires the software uninstallation script from the shared storage server may be implemented in a way as follows: the host receives the software uninstallation script request, then extracts the software identifier carried in the software uninstallation script request, and retrieves and reads the software uninstallation script from the shared storage server by taking the software identifier as the index.

The data transmission between the virtual machine and the host is implemented in a way the same as the above.

Step 408~Step 409: The virtual machine executes the software uninstallation script, finishes software uninstallation and confirms to the host software uninstallation complete.

Step 410: The host confirms to the virtualization management server that the software uninstallation is completed.

Step 411: The virtualization management server confirms to the client that the software uninstallation is completed.

The client notifies the user that the software uninstallation is completed.

The information about the complete of the software uninstallation in Step 410-Step 411 may be transmitted through the VPN.

The above are only the preferred embodiments of the present disclosure and not intended to limit the scope of protection of the present disclosure.

INDUSTRIAL APPLICABILITY

In the embodiments of the present disclosure, a host transmits a software management request to a virtual machine; the host acquires a software management script from a shared storage server according to a request for the management script returned by the virtual machine after the software management request is receive; and the host transmits the acquired software management script to the virtual machine and indicates the virtual machine to execute the software management script. Also disclosed are a system and a device for managing software on the virtual machine in a cloud environment. By the schemes in the embodiments of the present disclosure, the operation of needing to configure an IP address to the virtual machine when the software on the virtual machine is managed is avoided and at the same time the problem that the software of a virtual machine not configured with an IP address in a cloud environment cannot be managed is solved.

What is claimed is:

1. A method for managing software on a virtual machine in a cloud environment, comprising:
   transmitting, by a host, a software management request to a virtual machine;
   receiving, by a host, a request for the management script returned by the virtual machine after the software management request is received, wherein the request for the management script carries the software identifier corresponding to the request management software;
   acquiring, by the host, a software management script from a shared storage server by taking the software identifier as the index; and
   transmitting, by the host, the acquired software management script to the virtual machine and indicating the virtual machine to execute the software management script;
   when the host transmits the acquired software installation script to the virtual machine and indicates the virtual machine to execute the software installation script, transmitting, by the host, a software installation package to the virtual machine according to a software installation package request initiated by the virtual machine when the virtual machine executes the software installation script, and indicating the virtual machine to install the software installation package.

2. The method according to claim 1, wherein transmitting, by the host, the software management request to the virtual machine comprises:
   when the host receives the software management request transmitted by a virtualization management server, transmitting, by the host, the software management request to the virtual machine, wherein the software management request received by the host is transmitted after the virtualization management server generates the software management script according to the software management request from a client and uploads the software management script to the shared storage server.

3. The method according to claim 1, wherein the software management request comprises a software installation request and a software uninstallation request;
   the request for the management script comprises a request for a software installation script and a request for a software uninstallation script; and
   the software management script comprises the software installation script and the software uninstallation script.

4. The method according to claim 1, before the host transmits the software installation package to the virtual machine, further comprising:
   acquiring, by the host, the software installation package from the shared storage server according to the software installation package request transmitted by the virtual machine.

5. The method according to claim 4, wherein
   a Para-virtualization serial port is created in the virtual machine; and the host transmits the software management request, the software management script or the software installation package to the virtual machine through the Para-virtualization serial port, and receives the request for the management script transmitted by the virtual machine through the Para-virtualization serial port.

6. The method according to claim 1, wherein a Para-virtualization serial port is created in the virtual machine; and the host transmits the software management request, the software management script or the software installation package to the virtual machine through the Para-virtualization serial port, and receives the request for the management script transmitted by the virtual machine through the Para-virtualization serial port.

7. A host, located in a cloud environment and running a virtual machine, the host comprising: a first receiving unit, an acquiring unit and a first transmission unit, wherein the first receiving unit is configured to receive a request for the management script returned by the virtual machine after the virtual machine receives a software management request;

the acquiring unit is configured to receive a request for the management script returned by the virtual machine after the software management request is received, wherein the request for the management script carries the software identifier corresponding to the request management software and acquire the software management script from the shared storage server by taking the software identifier as the index; and the first transmission unit is configured to transmit the software management request to the virtual machine, and transmit the software management script acquired by the acquiring unit to the virtual machine;

wherein the first receiving unit is further configured to receive a software installation package request transmitted by the virtual machine after the first transmission unit transmits the software installation script to the virtual machine; the acquiring unit is further configured to acquire the software installation package from the shared storage server according to the software installation package request received by the first receiving unit; and the first transmission unit is further configured to transmit the software installation package acquired from the shared storage server to the virtual machine.

8. The host according to claim 7, wherein the first transmission unit is further configured to transmit the software management request to the virtual machine when the first receiving unit receives the software management request transmitted by a virtualization management server, wherein the software management request received by the host is transmitted after the virtualization management server generates the software management script according to the software management request from a client and uploads the software management script to the shared storage server.

9. The host according to claim 7, wherein the software management request comprises a software installation request and a software uninstallation request;

the request for the management script comprises a request for a software installation script and a request for a software uninstallation script; and the software management script comprises the software installation script and the software uninstallation script.

10. The host according to claim 9, wherein the first transmission unit transmits the software management request, the software management script or the software installation package to the virtual machine through a Para-virtualization serial port in the virtual machine, and receives the request for the management script transmitted by the virtual machine through the Para-virtualization serial port.

11. The host according to claim 7, wherein the first transmission unit transmits the software management request, the software management script or the software installation package to the virtual machine through a Para-virtualization serial port in the virtual machine, and receives the request for the management script transmitted by the virtual machine through the Para-virtualization serial port.

12. A device for managing software on a virtual machine, run on a host in a cloud environment, the device comprising:

a hardware processor, configured to perform programming units stored in a memory, wherein the programming units comprise:

a second receiving unit, a second transmission unit and an execution unit, wherein the second receiving unit is configured to receive a software management request transmitted by the host, and receive a software management script transmitted by the host after the second transmission unit transmits a request for the management script to the host;

the second transmission unit is configured to transmit a request for the management script to the host when the second receiving unit receives a software management request transmitted by the host, wherein the request for the management script carries the software identifier corresponding to the request management software; and the execution unit is configured to execute the software management script after the second receiving unit receives the software management script transmitted by the host;

wherein the execution unit further comprises: a triggering subunit, configured to trigger the second transmission unit to execute an operation of transmitting the software installation package request to the host when the second receiving unit receives the software installation script; the second transmission unit is further configured to transmit the software installation package request to the host when the triggering subunit triggers the second transmission unit to execute the operation of transmitting the software installation package request to the host; and the second receiving unit is further configured to receive the software installation package transmitted by the host after the second transmission unit transmits the software installation package request to the host.

13. The device according to claim 12, wherein the software management request comprises a software installation request and a software uninstallation request;

the request for the management script comprises a request for a software installation script and a request for a software uninstallation script; and the software management script comprises the software installation script and the software uninstallation script.

14. The device according to claim 12, wherein the second receiving unit is further configured to receive the software management request, the software management script or the software installation package transmitted by the host through a Para-virtualization serial port in the virtual machine, and the second transmission unit is further configured to transmit the request for the management script or the software installation package request to the host through the Para-virtualization serial port in the virtual machine.

15. A system for managing software on a virtual machine in a cloud environment, comprising: a shared storage server, a virtual machine and a host running the virtual machine, wherein the shared storage server is configured to store a software management script;

the host is configured to transmit a software management request to the virtual machine, receive a request for the management script returned by the virtual machine after the software management request is received, wherein the request for the management script carries the software identifier corresponding to the request management software, and acquire a software management script from the shared storage server by taking the software identifier as the index, and transmit the acquired software management script to the virtual machine and indicate the virtual machine to execute the software management script; and the virtual machine is configured to receive the software management request transmitted by the host, and return the request for the management script to the host;

when the host transmits the acquired software installation script to the virtual machine and indicates the virtual machine to execute the software installation script, transmitting, by the host, a software installation package to the virtual machine according to a software installation package request initiated by the virtual machine when the virtual machine executes the software installation script, and indicating the virtual machine to install the software installation package.

16. The system according to claim 15, further comprising a client and a virtualization management server, wherein the virtualization management server is configured to generate the software management script according to the software management request from the client, upload the generated software management script to the shared storage server and transmit the software management request to the host.

17. The system according to claim 15, wherein the host is the host according to claim 7, and the virtual machine is the virtual machine according to claim 12.

* * * * *